(12) United States Patent
Nakata et al.

(10) Patent No.: US 9,034,138 B2
(45) Date of Patent: May 19, 2015

(54) METHOD FOR MANUFACTURING POLARIZING PLATE

(71) Applicant: NITTO DENKO CORPORATION, Ibaraki-shi, Osaka (JP)

(72) Inventors: Mie Nakata, Ibaraki (JP); Tetsurou Takeda, Ibaraki (JP); Shunsuke Murayama, Ibaraki (JP); Tomohiro Yamashita, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 36 days.

(21) Appl. No.: 14/061,263

(22) Filed: Oct. 23, 2013

(65) Prior Publication Data

US 2014/0116618 A1 May 1, 2014

(30) Foreign Application Priority Data

Oct. 26, 2012 (JP) .................................. 2012-236864

(51) Int. Cl.
*B29C 65/00* (2006.01)
*B32B 1/00* (2006.01)
(Continued)

(52) U.S. Cl.
CPC . *B32B 1/00* (2013.01); *G02B 5/305* (2013.01); *G02B 5/3041* (2013.01); *G02B 5/3033* (2013.01); *B29C 65/48* (2013.01); *B29C 65/52* (2013.01); *B29C 65/4825* (2013.01); *B29C 66/1122* (2013.01); *B29C 66/342* (2013.01); *B29C 66/45* (2013.01); *B32B 7/00* (2013.01); *B29C 66/7315* (2013.01); *B29C 66/73365* (2013.01); *B29C 66/7338* (2013.01); *B29C 66/81457* (2013.01); *B29C 66/83413* (2013.01);
*B29C 66/929* (2013.01); *B29C 66/939* (2013.01); *B29L 2011/00* (2013.01);
(Continued)

(58) Field of Classification Search
CPC .... G02B 5/305; G02B 5/3033; G02B 5/3041; B29C 37/003; B29C 66/342; B29C 66/7338; B29C 66/83415
USPC .......................... 156/324; 264/1.34; 428/1.31; 359/485.03, 485.01
See application file for complete search history.

(56) References Cited

U.S. PATENT DOCUMENTS

2003/0169497 A1* 9/2003 Ito et al. .......................... 359/485
2005/0248846 A1* 11/2005 Sakamaki ....................... 359/490
(Continued)

FOREIGN PATENT DOCUMENTS

JP 2002-365432 A 12/2002
JP 2008-37092 A 2/2008
(Continued)

*Primary Examiner* — John Goff
(74) *Attorney, Agent, or Firm* — Westerman, Hattori, Daniels & Adrian, LLP

(57) ABSTRACT

A method for manufacturing a polarizing plate, the method comprising bonding a first transparent protective film and a second transparent protective film to both sides of a polarizer with an adhesive layer interposed between the polarizer and each of the first and second transparent protective films, wherein the first and second transparent protective films have different elasticities (elastic modulus×thickness (μm)), the three films are pressure-bonded by being simultaneously allowed to pass between a pair of rolls, a direction in which the polarizer is fed and allowed to pass between the pair of rolls is inclined toward the high-elasticity film. The polarizing plate obtained by the method can be suppressed the occurrence of bubbles between the polarizer and the transparent protective films.

2 Claims, 2 Drawing Sheets

(51) Int. Cl.

| | | |
|---|---|---|
| *G02B 5/30* | (2006.01) | |
| *B29C 65/48* | (2006.01) | |
| *B32B 7/00* | (2006.01) | |
| *B32B 37/00* | (2006.01) | |
| *B29C 65/52* | (2006.01) | |
| *B29L 11/00* | (2006.01) | |
| *B32B 37/12* | (2006.01) | |
| *B29C 65/14* | (2006.01) | |

(52) U.S. Cl.
CPC .......... *B29C 65/482* (2013.01); *B29C 65/4865* (2013.01); *B32B 2307/42* (2013.01); *B32B 37/003* (2013.01); *B32B 37/12* (2013.01); *B32B 2307/412* (2013.01); *B32B 2309/06* (2013.01); *B29C 66/934* (2013.01); *B29C 65/1403* (2013.01); *B29C 65/4845* (2013.01); *B29C 66/83415* (2013.01)

(56) References Cited

U.S. PATENT DOCUMENTS

| | | | |
|---|---|---|---|
| 2008/0011411 | A1 | 1/2008 | Fujita et al. |
| 2008/0112047 | A1 | 5/2008 | Mizushima et al. |
| 2009/0040434 | A1* | 2/2009 | Kawamoto et al. ............. 349/96 |
| 2010/0206478 | A1 | 8/2010 | Fujita et al. |
| 2012/0067506 | A1* | 3/2012 | Tan et al. ........................ 156/83 |

FOREIGN PATENT DOCUMENTS

| | | |
|---|---|---|
| JP | 2008-122790 A | 5/2008 |
| JP | 2010-125702 A | 6/2010 |

* cited by examiner

METHOD FOR MANUFACTURING POLARIZING PLATE

BACKGROUND OF THE INVENTION

1. Field of the Invention

The invention relates to a method for manufacturing a polarizing plate by bonding a first and a second transparent protective films to both sides of a polarizer with an adhesive layer interposed therebetween.

2. Description of the Related Art

In a process of manufacturing a polarizing plate in related art, a water-based adhesive or pressure-sensitive adhesive is generally used to bond transparent protective films to both sides of a polarizer having a predetermined water content. Examples of the method used to bond transparent protective films to both sides of a polarizer include a simultaneous lamination method that includes feeding a polarizer between a pair of rolls and feeding transparent protective films to both sides of the polarizer so that the transparent protective films can be simultaneously bonded to both sides; and a sequential lamination method that includes feeding a polarizer between a pair of rolls, feeding a transparent protective film to one side of the polarizer to bond it to the one side, and then bonding another transparent protective film to the other side of the polarizer.

Unfortunately, these lamination methods have a problem in that bubbles can be formed between the polarizer and the transparent protective film in the process of obtaining the polarizing plate by bonding the transparent protective films to the polarizer.

To solve this problem, JP-A-2008-037092 proposes a sequential lamination method that includes allowing a polarizer and a first transparent protective film to pass between a pair of a first metal roll and a first elastic roll in such a manner that the first transparent protective film is placed on the first metal roll side, so that they are pressure-bonded to form a laminated film; and then allowing the laminated film without winding it and a second transparent protective film to pass between a pair of a second metal roll and a second elastic roll in such a manner that the second transparent protective film is placed on the second metal roll side, so that they are pressure-bonded to form a polarizing plate.

JP-A-2010-125702 proposes a method for manufacturing a laminated film, which includes purging entrained air from film surfaces with replacement gas having a water solubility of 0.1 cm$^3$/cm$^3$H$_2$O (20° C., 1 atm) or more and bonding films together while the air on the surface of each film is replaced with the replacement gas.

In addition, JP-A-2002-365432 proposes that a polarizing film and a protective film should be bonded together with an adhesive whose viscosity is adjusted to 3 to 20 mPa·s (25° C.) JP-A-2008-122790 describes a method for manufacturing a polarizing plate by bonding transparent protective films with different thicknesses to both sides of a polarizer. The techniques disclosed in JP-A-2002-365432 and JP-A-2008-122790 are applicable to the simultaneous lamination method. However, JP-A-2002-365432, which aims to improve the appearance of a polarizing plate, or JP-A-2008-122790, which aims to suppress curling of a polarizing plate, does not necessarily remedy the problem of bubbles mentioned above.

SUMMARY OF THE INVENTION

It is an object of the invention to provide a method for manufacturing a polarizing plate by bonding transparent protective films to both sides of a polarizer between a pair of rolls in such a manner that the occurrence of bubbles between the polarizer and the transparent protective films can be suppressed.

As a result of earnest study to achieve the above object, the inventors have accomplished the invention based on findings that the object can be achieved by the polarizing plate-manufacturing method described below.

That is, the invention relates to a method for manufacturing a polarizing plate, the method including bonding a first transparent protective film and a second transparent protective film to both sides of a polarizer with an adhesive layer interposed between the polarizer and each of the first and second transparent protective films, wherein the first and second transparent protective films have different elasticities which are each defined as the value of elastic modulus (MPa)×thickness (μm) of each film, wherein one having a high elasticity is referred to as a high-elasticity film, and another having a low elasticity is referred to as a low-elasticity film, the three films, which are the polarizer, the first transparent protective film and the second transparent protective film, are pressure-bonded by being simultaneously allowed to pass between a pair of rolls, the three films are bonded together at a contact point on a first virtual line, wherein the first virtual line connects the respective center points of the pair of rolls and the contact point between the pair of rolls, and a direction in which the polarizer is fed and allowed to pass between the pair of rolls is inclined from a second virtual line toward the high-elasticity film, wherein the second virtual line is defined as a line in a direction perpendicular to the first virtual line.

In the method for manufacturing a polarizing plate, an angle made by the direction in which the fed polarizer and the second virtual line is preferable in the range of more than 0° and 1° or less.

In a method in related art for manufacturing a polarizing plate by simultaneous lamination of a first transparent protective film, a polarizer, and a second transparent protective film, the polarizer placed at a middle point of a pair of rolls to form a laminate is fed in a direction perpendicular to the pair of rolls. In this method, if the first and second transparent protective films have different elasticities (elastic modulus× thickness), the elasticity difference can cause distortion during the simultaneous lamination, so that a wrinkle can easily occur in the polarizer and bubbles can occur in the wrinkled part. The polarizer can be easily wrinkled, and once a wrinkle occurs, bubbles or unevenness can occur in the wrinkled part of the resulting polarizing plate.

The method of the invention for manufacturing a polarizing plate includes bonding, between a pair of rolls, first and second transparent protective films with different elasticities to both sides of a polarizer, in which the polarizer being fed between the pair of rolls is inclined toward one of the first and second transparent protective films, which corresponds to a high-elasticity film having higher elasticity. Thus, even when the first and second transparent protective films used have different elasticities, the adjustment of the angle at which the polarizer is fed makes it possible to manufacture a polarizing plate with suppressed wrinkles and bubbles.

The polarizing plate obtained by this manufacturing method has a good appearance with no bubbles between the respective films, no wrinkles, or no streaky irregularities. The polarizing plate can form an image display device such as a liquid crystal display (LCD) device or an electroluminescence display (ELD) device having high in-plane uniformity, high resolution, and high contrast.

DETAILED DESCRIPTION OF THE PREFERRED EMBODIMENTS

Figure 1:
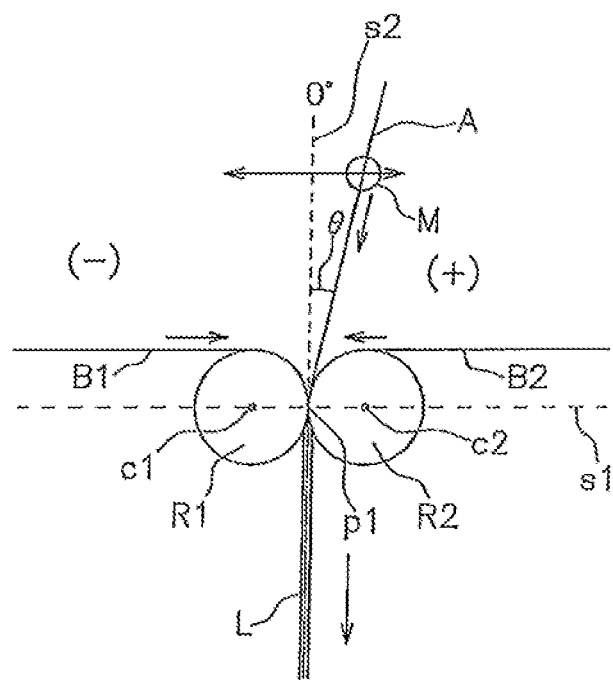
FIG. 1 is a schematic diagram showing an example of the method of the invention for manufacturing a polarizing plate.

Hereinafter, the method of the invention for manufacturing a polarizing plate will be described with reference to the drawings. FIG. 1 shows an example of the method of the invention for manufacturing a polarizing plate, in which a first transparent protective film B1 and a second transparent protective film B2 are allowed to pass between a pair of a first roll R1 and a second roll R2 so that they are pressure-bonded to both sides of a polarizer A to form a polarizing plate L. In FIG. 1, the first transparent protective film B1 and the second transparent protective film B2 have different elasticities, which are each defined as the value the elastic modulus (MPa)×thickness (μm). The elasticity of the second transparent protective film B2 is higher than the elasticity of the first transparent protective film B1, and the second transparent protective film B2 is a high-elasticity film, while the first transparent protective film B1 is a low-elasticity film.

FIG. 1 shows a first virtual line s1 connecting the center points c1 and c2 of the rolls R1 and R2 and a contact point p1 at which the three films (the polarizer A, the first transparent protective film B1, and the second transparent protective film B2) are bonded together between the pair of rolls R1 and R2. FIG. 1 also shows a second virtual line s2 in a direction perpendicular to the first virtual line s1. In the invention, the three films are pressure-bonded together by being simultaneously allowed to pass between the pair of rolls R1 and R2. In this process, as shown in FIG. 1, the feed direction in which the polarizer A is fed and allowed to pass between the pair of rolls R1 and R2 (in FIG. 1, the feed direction is the same as the direction of the polarizer A) is inclined from the second virtual line s2 toward the high-elasticity film (second transparent protective film B2).

In FIG. 1, the second virtual line s2 is used as a center line, which is called a 0° line. FIG. 1 shows that the line along which the polarizer A is fed makes an angle (angle θ of inclination) with the second virtual line s2. The angle θ of inclination is expressed as a plus (+) value when the direction in which the polarizer A is fed is inclined from the second virtual line s2 (center line) toward the high-elasticity film (second transparent protective film B2). On the other hand, in FIG. 1, the angle θ of inclination is expressed as a minus (−) value when the line along which the polarizer A is fed is inclined toward the low-elasticity film (first transparent protective film B1).

The angle θ of inclination is preferably adjusted to fall within the range of more than 0° and 2° or less. To suppress the formation of bubbles, the angle θ of inclination is more preferably 0.1° or more, even more preferably 0.5° or more. On the other hand, in view of feed performance, the angle θ of inclination is preferably 1.5° or less, more preferably 1° or less.

Figure 2:
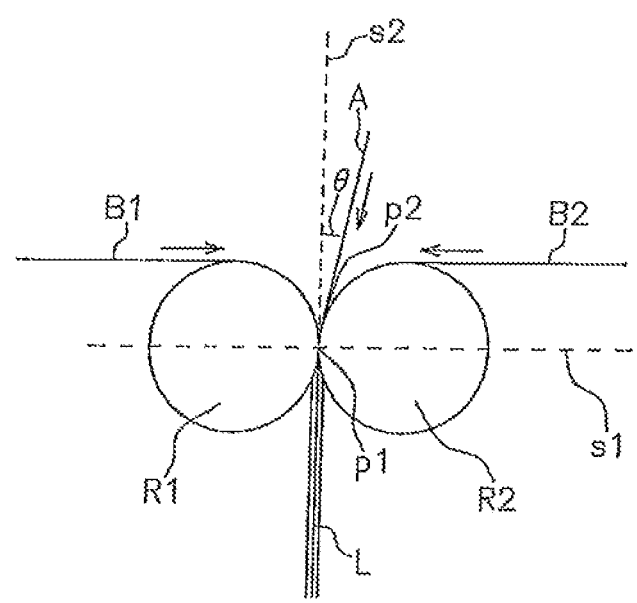
FIG. 2 is a schematic diagram showing an example of the method of the invention for manufacturing a polarizing plate.

FIG. 2 is a schematic diagram of an enlarged part of FIG. 1 showing the method of the invention for manufacturing a polarizing plate. In FIG. 1, if the direction in which the polarizer A is fed coincident with the direction at which the angle θ of inclination is "0°" and if the first and second transparent protective films B1 and B2 have the same elasticity, the first and second transparent protective films B1 and B2 can be uniformly bonded at the contact point p1 to both sides of the polarizer A, so that the formation of wrinkles and bubbles can be suppressed. On the other hand, in a simultaneous lamination process, if first and second transparent protective films B1 and B2 having different elasticities are bonded only at the contact point p1, the elasticity difference can cause distortion, which can easily cause wrinkles, so that bubbles can easily occur.

In the method of the invention for manufacturing a polarizing plate, as shown in FIG. 2, the high-elasticity film (second transparent protective film B2) is first brought into contact with one side of the polarizer A at a contact point p2. The low-elasticity film (first transparent protective film B1) is then brought into contact with the other side of the polarizer A at the contact point p1, and the three films are bonded together at the contact point p1. It is considered that according to the invention as described above, the high-elasticity film (second transparent protective film B2) can be brought into contact with the polarizer A at the contact point p2, so that the low-elasticity film (first transparent protective film B1) can be subsequently bonded with reduced distortion.

In FIG. 1, there is provided means M for changing the angle of the polarizer A before the polarizer A is fed between the pair of first and second rolls R1 and R2. The angle θ of inclination can be adjusted by the angle changing means M. In FIG. 1, the angle θ of inclination can be adjusted by shifting the angle changing means M from side to side.

Between the pair of first and second rolls R1 and R2, the first and second transparent protective films B1 and B2 are bonded to both sides of the polarizer A with an adhesive layer (not shown) interposed between the polarizer A and each of the first and second transparent protective films B1 and B2. The adhesive layer may be provided on the first transparent protective film B1 and/or the second transparent protective film B2, provided on the polarizer A, or provided on both of them. Alternatively, immediately before the polarizer A and the first and second transparent protective films B1 and B2 are bonded together, they may be coated with an adhesive (solution) or pressure-sensitive adhesive (solution) with an adjusted concentration or viscosity and pressure-bonded together by being allowed to pass between the pair of first and second rolls R1 and R2.

It will be understood that the material of the rolls, the diameter of the rolls, the feed rate during the bonding, and other conditions can be controlled as desired and the thickness of the adhesive layer can also be controlled as desired.

The first and second rolls R1 and R2 to be used may each be, for example, any of an elastic roll and a metal roll. The first and second rolls R1 and R2 may be the same or different.

An elastic roll having a metal core coated with a rubber layer or a resin layer may preferably be used. The hardness of the rubber layer or the resin layer to be used is preferably 70 or more, more preferably 80 or more, even more preferably 85 or more. To prevent the film surface from being scratched, the hardness of the rubber layer or the resin layer is preferably 100 or less, more preferably 95 or less. For example, this hardness can be measured by the method provided in JIS K 6253 (1997) using a commercially available durometer (type A). The thickness of the rubber layer or the resin layer is preferably from about 1 to about 15 mm, more preferably from about 3 to about 10 mm in view of uniformity of contact pressure distribution.

For example, the metal roll may be made of iron, stainless steel, titanium, aluminum, or other metals. In view of cost performance and corrosion resistance, the metal roll is preferably an iron roll or a stainless steel roll.

As the diameter of the rolls decreases, the contact area between the polarizer A and the first and second transparent protective films B1 and B2 decreases, so that the pressure applied to the film surface relatively increases. Thus, the diameter of the rolls to be used is preferably 250 mm or less, more preferably 200 mm or less. However, if the diameter is too small, the rolls may have low durability so that it may be impossible to apply a sufficient force. Thus, the diameter of the rolls to be used is preferably 50 mm or more, more preferably 100 mm or more.

The feed rate adjusted in the bonding process is generally preferably, but not limited to, about 2 m/minute to about 50 m/minute.

In the bonding process, the lamination pressure between the rolls may be appropriately set at any desired level. In view of easiness of control and in view of the productivity of the polarizing plate, the lamination pressure is preferably from about 2 MPa to about 5 MPa, more preferably from 3 MPa to 4 MPa. If the lamination pressure is less than 2 MPa, pressing may be insufficient so that bubbles may occur between the films. If the lamination pressure is more than 5 MPa, the rolls or an apparatus may be overloaded, which may be a cause of breakage. The lamination pressure can be determined by a measurement process including using a pressure sensitive paper sheet PRESCALE manufactured by FUJIFILM Corporation, binarizing the change in the color of the pressure sensitive paper sheet by computer image processing, and determining the lamination pressure from an approximate expression of a pressure standard line produced with respect to the coloring area and the density.

A polarizer is, but not limited to, various kinds of polarizer may be used. As a polarizer, for example, a film that is uniaxially stretched after having dichromatic substances, such as iodine and dichromatic dye, absorbed to hydrophilic polymer films, such as polyvinyl alcohol-based film, partially formalized polyvinyl alcohol-based film, and ethylene-vinyl acetate copolymer-based partially saponified film; polyene-based alignment films, such as dehydrated polyvinyl alcohol and dehydrochlorinated polyvinyl chloride, etc. may be mentioned. In these, a polyvinyl alcohol-based film on which dichromatic materials such as iodine, is absorbed and aligned after stretched is suitably used. Thickness of polarizer is, but not limited to, generally about 80 μm or less. The polarizer preferably has a thickness of 15 to 35 μm. If the polarizer is too thin, it may be easily damaged when bonded to transparent protective films. On the other hand, if the polarizer is too thick, the drying efficiency may tend to be low, which is not preferred in view of productivity.

A polarizer that is uniaxially stretched after a polyvinyl alcohol-based film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol-based film may be dipped in water and rinsed if needed. By rinsing polyvinyl alcohol-based film with water, effect of preventing un-uniformity, such as unevenness of dyeing, is expected by making polyvinyl alcohol-based film swelled in addition that also soils and blocking inhibitors on the polyvinyl alcohol-based film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

The water content of the polarizer is generally, but not limited to, preferably 8 to 30% by weight, more preferably 10 to 20% by weight. If the polarizer has a relatively low water content, the drying efficiency in the drying process will be high so that the production rate can be increased, which is preferable in terms of productivity. The polarizer also preferably has a relatively low water content, so that it can form a polarizing plate with good optical properties. If the water content of the polarizer is too low, however, the polarizer film may have high rigidity and be easily damaged, so that appearance defects may easily occur. In general, the water content of the polarizer can be controlled by the drying conditions in the process of producing the polarizer. If necessary, however, a moisture control process may be independently performed in which immersion in a water bath or spray of water droplets may be performed, or drying may be performed again by heating or under reduced pressure.

The method of producing the polarizer is not limited to the above method, and any other method capable of achieving a water content of 8 to 30% by weight (preferably a water content of 10 to 20% by weight) may be used to produce the polarizer. For example, the polarizer may be produced by a dry stretch process or by a process including kneading a polymer film material such as polyethylene terephthalate (PET) with a dichroic material, forming the mixture into a film, and stretching the film. The polarizer may also be an O-type film including a uniaxially oriented liquid crystal as a host to which a dichroic dye is added as a guest (U.S. Pat. No. 5,523,863 and JP-W-03-503322) or an E-type film produced with a dichroic lyotropic liquid crystal or the like (U.S. Pat. No. 6,049,428).

The elastic modulus of each of the first and second transparent protective films to be used is preferably, but not limited to, in the range of 1,000 to 10,000 MPa. The elastic modulus is preferably from 1,200 to 5,000 MPa, more preferably from 1,300 to 4,000 MPa. As long as the first and second transparent protective films differ in the elasticity, the first and second transparent protective films may be the same or different in elastic modulus.

The elastic modulus of the transparent protective film is the value ($N/mm^2$=MPa) determined according to the tensile test of JIS K 7127. More specifically, the elastic modulus was determined under the following conditions.

Horizontal axis used to determine elastic modulus (the slope in the chart): distortion (%)

Vertical axis used to determine elastic modulus (the slope in the chart): tensile stress $\sigma$ (MPa=$N/mm^2$)=F/the initial cross-sectional area A ($mm^2$) of the test piece Range used to determine elastic modulus (the slope in the chart): linear regression between 0.05% and 0.25% distortion Test piece shape: strip shape (100 mm in distance between measurements, 50 mm in width)

Chuck-chuck distance: 100 mm

In general, the thickness of each of the first and second transparent protective films is preferably from about 20 to about 200 μm, more preferably from 30 to 100 μm, in view of strength, workability such as handleability, thin layer properties, or other properties, although it may be determined as desired. When the thickness of each of the first and second transparent protective films falls within the above range, a high drying efficiency can be obtained, and a roll of longer film can be used, which is preferable in terms of productivity. On the other hand, as the thickness of the first and second transparent protective films are thick, the drying efficiency decreases, which is not preferable in terms of productivity.

The elastic modulus and thickness of each of the first and second transparent protective films are so selected that they have different elasticities, which are each defined as the product of the elastic modulus (MPa) and the thickness (μm) of each film (elastic modulus (MPa)×thickness (μm)). Of the first and second transparent protective films, one having a high elasticity is referred to as a high-elasticity film, and the other having a low elasticity is referred to as a low-elasticity film.

The difference between the elasticities of the high-elasticity film and the low-elasticity film is preferably more than 0 and not more than 170,000 in view of wrinkling. In particular, when the difference is 1,000 or more, specifically, 3,000 or more, distortion can easily occur due to the difference in elasticity, and the invention may be suitable for use in such cases.

The first and second transparent protective films may be of any type. The material and thickness for each of the first and second transparent protective films are so selected that one of them can be a high-elasticity film and the other can be a low-elasticity film. To control the elasticities for the high-elasticity film and the low-elasticity film, different materials (different in elastic modulus) can be selected for the first and second transparent protective films. When the same material (the same in elastic modulus) is used, the elasticities can be controlled by the thickness.

A thermoplastic resin with a high level of transparency, mechanical strength, thermal stability, moisture blocking properties, isotropy, and the like may be used as a material for forming the transparent protective film. Examples of such a thermoplastic resin include polyester resins such as polyethylene terephthalate, polyethylene naphtha late; cellulose resins such as diacetylcellulose, triacetylcellulose; acrylic polymers such as poly(methyl methacrylate); and styrene polymers such as polystyrene, acrylonitrile-styrene copolymers (AS resins); polycarbonate polymers. Besides, as examples of the polymer forming a transparent protective film, polyolefin polymers such as polyethylene, polypropylene, polyolefin that has cyclo-type or norbornene structure, ethylene-propylene copolymer; vinyl chloride polymers; amide polymers such as nylon and aromatic polyamide; imide polymers; sulfone polymers; polyether sulfone polymers; polyether-ether ketone polymers; polyphenylene sulfide polymers; vinyl alcohol polymers; vinylidene chloride polymers; vinyl butyral type polymers; arylate polymers; polyoxymethylene polymers; epoxy polymers, or blend polymers of the above-mentioned polymers may be mentioned. The transparent protective film is provided with a cured layer made from thermosetting resins or ultraviolet curing resins such as acrylic, urethane, acrylic urethane, epoxy, or silicone resins. The transparent protective film is generally laminated to one side of the polarizer with the adhesive layer, but thermosetting resins or ultraviolet curing resins such as (meth) acrylic, urethane, acrylic urethane, epoxy, or silicone resins may be used to other side of the polarizer for the transparent protective film. The transparent protective film may also contain at least one type of any appropriate additive. Examples of the additive include an ultraviolet absorbing agent, an antioxidant, a lubricant, a plasticizer, a release agent, an anti-discoloration agent, a flame retardant, a nucleating agent, an antistatic agent, a pigment, and a colorant. The content of the thermoplastic resin in the transparent protective film is preferably from 50 to 100% by weight, more preferably from 50 to 99% by weight, still more preferably from 60 to 98% by weight, particularly preferably from 70 to 97% by weight. If the content of the thermoplastic resin in the transparent protective film is 50% by weight or less, high transparency and other properties inherent in the thermoplastic resin can fail to be sufficiently exhibited.

In the invention, the transparent protective film is preferably made of at least one selected from cellulose resins (polymer), polycarbonate resins (polymer), cyclic polyolefin resins (polyolefin having a cyclo-structure or a norbornene structure), and (meth)acrylic resins.

To improve polarizing characteristics, durability, adhesive properties, and other properties, the surface of the transparent protective film may be subjected to a surface modification treatment such as a corona treatment, a plasma treatment, a flame treatment, an ozone treatment, a primer treatment, a glow discharge treatment, or a saponification treatment. Among these surface modification treatments, a saponification treatment with an alkali or the like is preferred when the transparent protective film is made of cellulose resins (polymer).

The other side of the transparent protective film where no polarizer is to be bonded may undergo the formation of a hard coat layer, an anti-reflection treatment, an anti-stick treatment, or a treatment for diffusion or antiglare properties.

The anti-reflection layer, the anti-stick layer, a diffusion layer, the antiglare layer, or other layers may be provided as part of the transparent protective film itself or may be provided as an additional optical layer on the transparent protective film.

The adhesive layer to be used may be of any type, such as a water-based adhesive layer, a solvent-based adhesive layer, a hot-melt adhesive layer, or a radical-curable adhesive layer. The adhesive layer used to bond the polarizer and the transparent protective film together may be of any type as long as it is optically transparent. A water-based adhesive or a radical-curable adhesive is preferably used to form the adhesive layer for use in bonding the polarizer and the transparent protective film together.

Examples of the water-based adhesive used to form the adhesive layer include, but are not limited to, a vinyl polymer-based adhesive, a gelatin-based adhesive, a vinyl-based adhesive, a latex-based adhesive, a polyurethane-based adhesive, an isocyanate-based adhesive, a polyester-based adhesive, and an epoxy-based adhesive. The adhesive layer may be produced from such a water-based adhesive by applying an aqueous solution of the adhesive and drying it. In the preparation of the aqueous solution, if necessary, a crosslinking agent or any other additive and a catalyst such as an acid may also be added. A vinyl polymer-containing adhesive or the like is preferably used as the water-based adhesive, and the vinyl polymer is preferably a polyvinyl alcohol-based resin. The polyvinyl alcohol-based resin may also contain a water-soluble crosslinking agent such as boric acid, borax, glutaraldehyde, melamine, or oxalic acid. Particularly when a polyvinyl alcohol-based polymer film is used to form the polarizer, an adhesive containing polyvinyl alcohol-based resin is preferably used in view of tackiness. An adhesive that contains a polyvinyl alcohol-based resin having an acetoacetyl group is more preferred in order to improve durability.

While no specific limitation is imposed on a polyvinyl alcohol-based resin, an average degree of polymerization is from about 100 to about 3000 and an average degree of saponification is from about 85 to about 100 mol % in consideration of adherence. The concentration of the adhesive solution is preferably from 0.1 to 15% by weight, more preferably from 0.5 to 10% by weight although it is not restricted and may be freely determined depending on the desired thickness of the adhesive layer. If the concentration of the solution is too high, the solution may have too high viscosity so that streaky irregularities may easily occur, and if the concentration of the solution is too low, the solution may have poor coatability and easily cause unevenness.

Examples of polyvinyl alcohol-based resin include: a polyvinyl alcohol obtained by saponifying a polyvinyl acetate; a derivative thereof; a saponified copolymer of vinyl acetate and a monomer copolymerizable therewith; and polyvinyl alcohols modified by acetalization, urethanization, etherification, grafting, phosphate esterification and the like. Examples of the monomers include, unsaturated carboxylic acids such as maleic anhydride, fumaric acid, crotonic acid, itaconic acid and (meth)acrylic acid, and esters thereof; α-olefins such as ethylene and propylene; (meth)allylsulfonic acid or sodium salt thereof, (meth)allylsulfonate; sodium sulfonate (monoalkyl maleate), sodium disulfonate (alkyl maleate); N-methylolacrylamide; an alkai salt of acrylamide alkylsulfonate; N-vinylpyrrolidone, a derivative of N-vinylpyrrolidone and the like. The polyvinyl alcohol-based resins can be either used alone or in combination of two kinds or more.

A polyvinyl alcohol-based resin having an acetoacetyl group is obtained by reacting a polyvinyl alcohol-based resin and diketene to each other with a known method. Examples of known methods include: a method in which a polyvinyl alcohol-based resin is dispersed into a solvent such as acetic acid, to which diketene is added and a method in which a polyvinyl alcohol-based resin is previously dissolved into a solvent such as dimethylformamide or dioxane, to which diketene is added. Another example is a method in which diketene gas or diketene liquid is brought into direct contact with a polyvinyl alcohol.

No specific limitation is imposed on a degree of modification by an acetoacetyl group in a polyvinyl alcohol-based resin having an acetoacetyl group or groups as far as the degree of modification is 0.1 mol % or more. If the degree of modification is less than 0.1 mol %, water resistance of an adhesive layer is insufficient, which is improper. A degree of modification by an acetoacetyl group is preferably from about 0.1 to about 40 mol %, more preferably from 1 to 20 mol %, especially preferably from 2 to 7 mol %. If a degree of modification by an acetoacetyl group exceeds 40 mol %, reaction sites with a crosslinking agent is fewer to thereby reduce an effect of improvement on moisture resistance and heat resistance. The degree of modification by an acetoacetyl group is a value determined by NMR (Nuclear Magnetic Resonance).

Any of crosslinking agents can be used as the crosslinking agent used in the general adhesive without a specific limitation thereon. As the adhesive using a polyvinyl alcohol-based resin, a crosslinking agent that can be preferably used is a compound having at least two functional groups having reactivity with a polyvinyl alcohol-based resin. Examples thereof include: alkylene diamines having an alkylene group and two amino groups such as ethylene diamine, triethylene diamine and hexamethylene diamine; isocyanates such as tolylene diisocyanate, hydrogenated tolylene diisocyanate, trimethylolpropane tolylene diisocyanate adduct, triphenylmethane triisocyanate, methylenebis(4-phenylmethane)triisocyanate and isophorone diisocyanate, and ketoxime-blocked products thereof or isocyanates of phenol-blocked products; epoxy compounds such as ethylene glycol diglycidyl ether, polyethylene glycol diglycidyl ether, glycerin di- or triglicydyl ether, 1,6-hexanediol diglycidyl ether, trimethylolpropane triglycidyl ether, diglicidyl aniline and diglycidyl amine; monoaldehydes such as formaldehyde, acetaldehyde, propionaldehyde and butylaldehyde; dialdehydes such as glyoxal, malonaldehyde, succindialdehyde, glutardialdehyde, maleic dialdehyde and phthaldialdehyde; amino-formaldehyde resins such as condensates with formaldehyde of methylolurea, methylolmelamine, alkylated methylolurea, alkylated methylolmelamine, acetoguanamine and benzoguanamine; salts of divalent metals or trivalent metals such as sodium, potassium, magnesium, calcium, aluminum, iron and nickel, and oxides of the metals. Preferable is a compound having a methylol group, especially preferable is a methylolmelamine.

Based on 100 parts by weight of the resin, the crosslinking agent is generally added in an amount of about 0.1 to about 35 parts by weight, preferably 10 to 25 parts by weight. When importance is attached to the durability of the adhesive, the crosslinking agent can be effectively added in an amount of 30 to 46 parts by weight, more preferably 32 to 40 parts by weight, in exchange for the fact that the time period from the preparation of the adhesive to the formation of the adhesive layer (pot life) is shortened.

Examples of the radical-curable adhesive include various types such as active energy ray-curable adhesives including electron beam-curable adhesives, and ultraviolet-curable adhesives and thermosetting adhesives. Among them, active energy ray-curable adhesives are preferred because they are curable in a short time. Ultraviolet-curable adhesives are particularly preferred.

Examples of the curable component include (meth)acryloyl group-containing compounds and vinyl group-containing compounds. These curable components may be monofunctional or bi- or poly-functional. These curable components may be used alone or in combination of two or more. Preferred examples of the curable component include (meth)acryloyl group-containing compounds and specifically include various epoxy (meth)acrylates, urethane (meth)acrylates, polyester (meth)acrylates, and various (meth)acrylate-based monomers.

In addition to the curable component, the curable adhesive may contains a radical initiator depending on the type of the curing. When the adhesive used is of an electron beam-curable type, it is not necessary to add the radical initiator to the adhesive. However, when the adhesive used is of an ultraviolet-curable or thermosetting type, the radical initiator should be used. The radical initiator is generally used in an amount of about 0.1 to about 10 parts by weight, preferably 0.5 to 3 parts by weight, based on 100 parts by weight of the curable component.

The adhesive may also contain a metal compound filler. The metal compound filler can be used to control the fluidity of the adhesive layer and to stabilize the film thickness so that a polarizing plate with a good appearance and in-plane uniformity can be obtained with no unevenness in tackiness.

To form the adhesive layer, a dry lamination method may preferably be used, which allows solvent-free lamination or low solvent lamination. The dry lamination method may be performed using a conventionally known dry lamination adhesive and a conventionally known lamination technique. This method may be used in combination with the essential feature of the invention. This is effective in further reducing streaky irregularities and other defects.

Examples of the dry lamination adhesive include two-part curable adhesives, two-part solvent-type adhesives, one-part solvent-free adhesives, etc. The two-part curable adhesives may be acryl-based or the like. The two-part solvent-type adhesives may be polyester-based, aromatic polyester-based, aliphatic polyester-based, polyester/polyurethane-based, polyether/polyurethane-based, or any other resin-based. The one-part solvent-free adhesives (moisture curing type) may be polyether/polyurethane-based or any other resin-based.

If necessary, the adhesive layer may contain any appropriate additives. Examples of additives include sensitizers for increasing the electron beam-curing rate or sensitivity, such as carbonyl compounds; coupling agents such as silane coupling agents and titanium coupling agents; adhesion promoters such as ethylene oxide; additives for improving wettability with the transparent protective film; additives for improving mechanical strength, workability or the like, such as acryloxy group-containing compounds and hydrocarbon compounds (natural or synthetic resin), ultraviolet absorbers, age resistors, dyes, processing aids, ion-trapping agents, antioxidants, tackifiers, fillers (other than the metal compound fillers), plasticizers, leveling agents, antifoaming agents, antistatic agents, and stabilizers such as heat resistant stabilizers and hydrolysis resistant stabilizers.

The polarizing plate can be obtained by bonding the transparent protective films to both sides of the polarizer with the adhesive layer interposed therebetween. Additionally, an undercoat layer, an adhesion facilitating layer, or any other layer may be provided between the adhesive layer and the transparent protective film or the polarizer.

When the adhesive layer is made from the water-based adhesive or the like by the above method, the thickness of the adhesive layer is preferably from 30 to 300 nm, more preferably from 60 to 250 nm. Alternatively, when the adhesive layer is made from the curable adhesive, the thickness of the adhesive layer is preferably from 0.1 to 200 µm, more preferably from 0.5 to 50 µm, even more preferably from 0.5 to 10 µm.

In the method for manufacturing a polarizing plate, a curing step may be performed, depending on the type of the adhesive, after the polarizer and the transparent protective films are bonded together. When the water-based adhesive is used, a drying step is performed. The drying conditions in the drying step are generally a drying temperature of about 40 to about 100° C. and a drying time of about 1 to about 10 minutes. For example, the radical-curable adhesive is irradiated with electron beams, ultraviolet rays, or the like.

A polarizing plate obtained by the method of the invention may be used in practical use as an optical film laminated with other optical layers. Although there is especially no limitation about the optical layers, one layer or two layers or more of optical layers, which may be used for formation of a liquid crystal display or the like, such as a reflector, a transflective plate, a retardation plate (a half wavelength plate and a quarter wavelength plate included), and a viewing angle compensation film, may be used. Particularly preferred is a reflective or transflective polarizing plate further including a reflector or a transflective plate placed on the polarizing plate according to the invention, an elliptically or circularly polarizing plate further including a retardation plate placed on the polarizing plate, a wide viewing angle polarizing plate further including a viewing angle compensation film placed on the polarizing plate, or a polarizing plate further including a brightness enhancement film placed on the polarizing plate.

The polarizing palate or the optical film of the invention is preferably used to form various types of image display devices such as liquid crystal display devices. Liquid crystal display devices may be produced according to conventional techniques. Specifically, liquid crystal display devices are generally produced by appropriately assembling a display device panel such as a liquid crystal cell and the polarizing palate or the optical film and optionally other components such as a lighting system and incorporating a driving circuit according to any conventional technique, except that the polarizing palate or the optical film of the invention is used. Any type of liquid crystal cell may also be used such as a TN type, an STN type, a π type.

Suitable liquid crystal display devices, such as liquid crystal display device with which the above polarizing palate or the optical film has been provided on one side or both sides of the display device panel such as a liquid crystal cell, and with which a backlight or a reflective plate is used for a lighting system may be manufactured. In this case, the polarizing palate or the optical film of the invention may be provided on one side or both sides of the display device panel such as a liquid crystal cell. When providing the polarizing palate or the optical films on both sides, they may be of the same type or of different type. Furthermore, in assembling a liquid crystal display device, suitable parts, such as diffusion plate, anti-glare layer, antireflection film, protective plate, prism array, lens array sheet, optical diffusion plate, and backlight, may be installed in suitable position in one layer or two or more layers.

The manufacturing method of the invention may also be used in a method for manufacturing a pressure-sensitive adhesive layer-attached polarizing plate including a polarizing plate and a pressure-sensitive adhesive layer provided thereon, in which a polarizing plate and a pressure-sensitive adhesive layer-attached separator are used as first and second films, respectively. The manufacturing method of the invention may also be used in a method for manufacturing a surface protecting film-attached polarizing plate or a pressure-sensitive adhesive layer-attached polarizing plate, in which a pressure-sensitive adhesive layer-attached polarizing plate or a polarizing plate is used as a first film, and a surface protecting film is used as a second film.

An optically functional layer may be placed on the polarizing plate. In this case, a method of placing the optically functional layer on the polarizing plate with an adhesive layer or a pressure-sensitive adhesive layer interposed therebetween is preferably used. In this case, a pressure-sensitive adhesive layer made of a pressure-sensitive adhesive is particularly preferably used among adhesive and pressure-sensitive adhesive layers.

Such a pressure-sensitive adhesive layer can be formed using any appropriate conventional pressure-sensitive adhesive such as an acryl-based, silicone-based, polyester-based, polyurethane-based, polyether-based, or rubber-based pressure-sensitive adhesive. The pressure-sensitive adhesive is preferably capable of forming a pressure-sensitive adhesive layer with low coefficient of moisture absorption and high heat resistance, from points of view such as prevention of a foaming or peeling phenomenon caused by moisture absorption, prevention of degradation of optical properties and warpage of a liquid crystal cell, which are caused by a thermal expansion difference or the like, and the ability to form an image display device with a high level of quality and durability. Also to prevent a change in the optical properties of the polarizing plate and other components, the pressure-sensitive adhesive preferably does not require a high temperature process for curing or drying or does not require a longtime for curing or drying. From these points of view, acryl-based pressure-sensitive adhesives are preferably used on the polarizing plate or the optical film. Fine particles may also be added to the pressure-sensitive adhesive, so that the resulting pressure-sensitive adhesive layer can exhibit light diffusion properties.

The adhesive or pressure-sensitive adhesive layer may be formed on the desired surface as needed. For example, concerning the polarizing plate formed using a polarizer and transparent protective films according to the invention, the adhesive or pressure-sensitive adhesive layer may be formed on one or both sides of the polarizing plate as needed, specifically, it may be formed on the other surface of the transparent protective film, which is opposite to the side bonded to the polarizer. The post-drying thickness of the pressure-sensitive adhesive layer made of the pressure-sensitive adhesive for use in placement of the optically functional layer is generally, but not limited to, about 1 to about 500 μm, preferably 5 to 200 μm, more preferably 10 to 100 μm. If the adhesive or pressure-sensitive adhesive layer has a thickness in the above range, the stress associated with the dimensional behavior of the polarizing plate or the optically functional layer can be relaxed.

When the pressure-sensitive adhesive layer made of a pressure-sensitive adhesive is exposed on the surface, the pressure-sensitive adhesive layer should preferably be temporarily covered with a separator for a purpose such as antifouling until use. The separator to be used preferably includes an appropriate film, similar to the protective film described above or the like, and optionally a release coating that is formed on the film and made of an appropriate release agent such as a silicone-based, long-chain alkyl-based, or fluorine-based release agent, or molybdenum sulfide.

The surface protecting film may include a base film and a pressure-sensitive adhesive layer that is formed on the base film in such a manner that the base film can be peeled off together with the pressure-sensitive adhesive layer.

The polarizing plate can be obtained by bonding the transparent protective films to both sides of the polarizer with the adhesive layer interposed therebetween. Additionally, an undercoat layer, an adhesion facilitating layer, or any other layer may be provided between the adhesive layer and the transparent protective film or the polarizer.

EXAMPLES

Hereinafter, the invention will be more specifically described with reference to examples and comparative examples, which however are not intended to limit the invention.
(Method for Measuring Water Content of Polarizer)
A 180 mm×500 mm sample was cut from the resulting polarizer, and its initial weight (W(g)) was measured. The sample was stored in a drying machine at 120° C. for 2 hours and then measured for post-drying weight (D(g)). These measured values were used to calculate the water content according to the following formula: water content (%)={(W−D)/W}×100.
(Preparation of Polarizer)
A 75 μm thick polyvinyl alcohol film (VF-PS7500 manufactured by KURARAY CO., LTD., 1,000 mm in width) was stretched to a stretch ratio of 2.5 times while immersed in pure water at 30° C. for 60 seconds. The stretched film was dyed in an aqueous iodine solution (pure water/iodine (I)/potassium iodide (KI)=100/0.01/1 in weight ratio) at 30° C. for 45 seconds, then stretched to a stretch ratio of 5.8 times in an aqueous 4% by weight boric acid solution. The resulting film was immersed in pure water for 10 seconds and then dried at 60° C. for 5 minutes while the tension on the film was maintained, so that a polarizer was obtained. The polarizer had a thickness of 25 μm and a water content of 15% by weight.
(Preparation of Adhesive Layer-Attached Transparent Protective Film)
A hundred parts by weight of PVA resin (GOHSENOL manufactured by The Nippon Synthetic Chemical Industry Co., Ltd.) and 35 parts by weight of a crosslinking agent (Watersol manufactured by DIC Corporation) were dissolved in 3,760 parts by weight of pure water to form an adhesive. The adhesive was applied to one side of a 60 μm thick triacetylcellulose (TAC) film (TD60UL manufactured by FUJIFILM Corporation, 4,000 MPa in elastic modulus) with a slot die and then dried at 85° C. for 1 minute so that an adhesive layer-attached TAC film having a 0.1 μm thick adhesive layer was obtained.

Example 1

(Preparation of Polarizing Plate)
A polarizing plate was prepared using the method shown in FIG. 1. The polarizer described above was used as the polarizer A, and the adhesive layer-attached TAC film was used as the first transparent protective film B1. An adhesive layer-attached acrylic film was used as the second transparent protective film B2. The adhesive layer-attached acrylic film was prepared in the same manner as the adhesive layer-attached TAC film, except that a 40 μm thick acrylic film (2,000 MPa in elastic modulus) was used instead of the TAC film. As shown in FIG. 1, the adhesive layer-attached TAC film (first transparent protective film B1) was fed from the first roll R1 side, while the adhesive layer-attached acrylic film (second transparent protective film B2) was fed from the second roll R2 side. The first and second rolls R1 and R2 used were iron rolls with a diameter of 200 mm.
(Method for Adjusting the Angle at which the Polarizer is Fed)

The angle θ of inclination between the center line (second virtual line s2) and the direction in which the polarizer was fed was defined as follows. The center line (second virtual line s2) was defined as an angle of 0°. The angle θ of inclination was expressed as a plus (+) value when the direction in which the polarizer was fed was inclined toward the high-elasticity film, and the angle θ of inclination was expressed as a minus (−) value when the direction in which the polarizer was fed was inclined toward the low-elasticity film. A movable roll was arranged 60 cm above the lamination part (contact point p1), and the angle θ of inclination was adjusted by shifting the movable roll from side to side.

In this process, each film was fed at a rate of 20 m/minute. The polarizing plate obtained by this process was dried at 80° C. for 2 minutes after the bonding.

Examples 2 to 7 and Comparative Examples 1 to 9

Polarizing plates were obtained in the same manner as in Example 1, except that the type of the first and second transparent protective films and the angle θ of inclination of the polarizer were changed as shown in Table 1.

The polarizing plates prepared in the examples and the comparative examples were evaluated as described below. Table 1 shows the results.
(Observation of Bubbles)
A 1,000 mm×1,000 mm sample was cut from each resulting polarizing plate and observed for the number of bubbles between the polarizer and the TAC film.
(Feed Performance)
Feed performance in the process of manufacturing the polarizing plate was evaluated according to the following criteria.

◯: No wrinkles or other defects occurred on the roll during the feeding.

×: A wrinkle occurred on the roll during the feeding.

TABLE 1

| | First transparent protective film | | | | Second transparent protective film | | | | Angle θ of inclination of polarizer | | Evaluation | |
|---|---|---|---|---|---|---|---|---|---|---|---|---|
| | Type | Elastic modulus (MPa) | Thickness (μm) | Elasticity (elastic modulus × thickness) | Type | Elastic modulus (MPa) | Thickness (μm) | Elasticity (elastic modulus × thickness) | High-elasticity film for reference | Angle (°) | Number of bubbles (counts) | Feed performance |
| Example 1 | TAC | 4000 | 60 | 240000 | Acryl | 2000 | 40 | 80000 | First transparent protective film | 1 | 0 | ○ |
| Comparative Example 1 | TAC | 4000 | 60 | 240000 | Acryl | 2000 | 40 | 80000 | First transparent protective film | 0 | 9 | ○ |
| Comparative Example 2 | TAC | 4000 | 60 | 240000 | Acryl | 2000 | 40 | 80000 | First transparent protective film | −1 | 55 | ○ |
| Example 2 | TAC | 4000 | 60 | 240000 | Acryl | 2000 | 40 | 80000 | First transparent protective film | 2 | 0 | X |
| Comparative Example 3 | TAC | 4000 | 60 | 240000 | Acryl | 2000 | 40 | 80000 | First transparent protective film | −2 | 199 | X |
| Example 3 | TAC | 4000 | 60 | 240000 | COP | 1800 | 50 | 90000 | First transparent protective film | 1 | 0 | ○ |
| Comparative Example 4 | TAC | 4000 | 60 | 240000 | COP | 1800 | 50 | 90000 | First transparent protective film | 0 | 13 | ○ |
| Comparative Example 5 | TAC | 4000 | 60 | 240000 | COP | 1800 | 50 | 90000 | First transparent protective film | −1 | 63 | ○ |
| Example 4 | TAC | 4000 | 60 | 240000 | COP | 1800 | 50 | 90000 | First transparent protective film | 2 | 0 | X |
| Comparative Example 6 | TAC | 4000 | 60 | 240000 | COP | 1800 | 50 | 90000 | First transparent protective film | −2 | 304 | X |
| Example 5 | TAC | 4000 | 60 | 240000 | TAC | 4000 | 40 | 160000 | First transparent protective film | 1 | 0 | ○ |
| Comparative Example 7 | Acryl | 2000 | 40 | 80000 | COP | 1800 | 50 | 90000 | Second transparent protective film | 0 | 11 | ○ |
| Comparative Example 8 | Acryl | 2000 | 40 | 80000 | COP | 1800 | 50 | 90000 | Second transparent protective film | −1 | 27 | ○ |
| Example 6 | Acryl | 2000 | 40 | 80000 | COP | 1800 | 50 | 90000 | Second transparent protective film | 1 | 0 | ○ |
| Comparative Example 9 | Acryl | 2000 | 40 | 80000 | COP | 1800 | 50 | 90000 | Second transparent protective film | −2 | 59 | X |
| Example 7 | Acryl | 2000 | 40 | 80000 | COP | 1800 | 50 | 90000 | Second transparent protective film | 2 | 0 | X |

In Table 1, TAC represents a 60 μm thick triacetylcellulose film (TD60UL manufactured by FUJIFILM Corporation, 4,000 MPa in elastic modulus), Acryl a 40 μm thick acrylic film (2,000 MPa in elastic modulus), and COP a 50 μm thick cyclic polyolefin film (ZEONOR manufactured by ZEON CORPORATION, 1,800 MPa in elastic modulus). In Example 5, TAC used had a thickness of 40 μm.

The results in Table 1 show that in each example according to the invention, a polarizing plate was successfully manufactured while the occurrence of bubbles between the polarizer and the transparent protective film was suppressed. In the examples, the feed performance was also good when the angle θ of inclination was 1° or less.

What is claimed is:

1. A method for manufacturing a polarizing plate, the method comprising bonding a first transparent protective film and a second transparent protective film to both sides of a polarizer with an adhesive layer interposed between the polarizer and each of the first and second transparent protective films, wherein
    the first and second transparent protective films have different elasticities which are each defined as the value of elastic modulus (MPa)×thickness (μm) of each film, wherein one having a high elasticity is referred to as a high-elasticity film, and another having a low elasticity is referred to as a low-elasticity film,
    three films, which are the polarizer, the first transparent protective film and the second transparent protective film, are pressure-bonded by being simultaneously allowed to pass between a pair of rolls,
    the three films are bonded together at a contact point on a first virtual line, wherein the first virtual line connects respective center points of the pair of rolls and the contact point between the pair of rolls, and
    a direction in which the polarizer is fed and allowed to pass between the pair of rolls is inclined from a second virtual line toward the high-elasticity film, wherein the second virtual line is defined as a line in a direction perpendicular to the first virtual line.

2. The method for manufacturing a polarizing plate according to claim 1, wherein an angle made by the direction in which the polarizer is fed and the second virtual line is in the range of more than 0° and 1° or less.

* * * * *